United States Patent [19]

Rückert et al.

[11] Patent Number: 5,288,191
[45] Date of Patent: Feb. 22, 1994

[54] DEVICE FOR THE CLAMPING ATTACHMENT OF SPACED STRUCTURAL PARTS

[75] Inventors: Edvard Rückert, Velbert; Willi Piontek, Essen, both of Fed. Rep. of Germany

[73] Assignee: Ewald Witte GmbH & Co. KG, Velbert, Fed. Rep. of Germany

[21] Appl. No.: 936,108

[22] Filed: Aug. 26, 1992

[30] Foreign Application Priority Data

Aug. 26, 1991 [DE] Fed. Rep. of Germany ....... 4128269
Jul. 24, 1992 [DE] Fed. Rep. of Germany ....... 4224575

[51] Int. Cl.$^5$ ............... F16B 37/08; F16B 39/284; F16G 11/00; B25G 3/00
[52] U.S. Cl. ............... 411/432; 411/112; 411/535; 403/409.1
[58] Field of Search ............... 411/111-113, 411/352, 353, 368, 535, 536, 546, 432; 403/408.1, 409.1

[56] References Cited

U.S. PATENT DOCUMENTS

| | | | |
|---|---|---|---|
| 1,746,978 | 2/1930 | Winkler | 411/536 |
| 1,966,780 | 7/1934 | Wyrick | 411/536 |
| 4,682,906 | 7/1987 | Ruckert et al. | 411/535 X |

FOREIGN PATENT DOCUMENTS

| | | | |
|---|---|---|---|
| 0176663 | 7/1988 | European Pat. Off. | |
| 764744 | 9/1952 | Fed. Rep. of Germany | 411/535 |
| 322361 | 7/1957 | Switzerland | 411/535 |

Primary Examiner—Neill R. Wilson
Attorney, Agent, or Firm—Martin A. Farber

[57] ABSTRACT

A device for the clamping attachment of spaced structural parts by a connecting screw and a distance plate arranged in the space between them, which plate is provided with ascent support surfaces opposite which there are form-fitting mating ascent support surfaces associated with the other structural part, the rotation of the support surfaces with respect to each other determining the axial distance assumed in the manner that the distance plate is carried along into the resting position by the connecting screw. In case of use the resting height (Al) is adapted to be reduced a predetermined amount by the clamping force of the connecting screw (4).

13 Claims, 10 Drawing Sheets

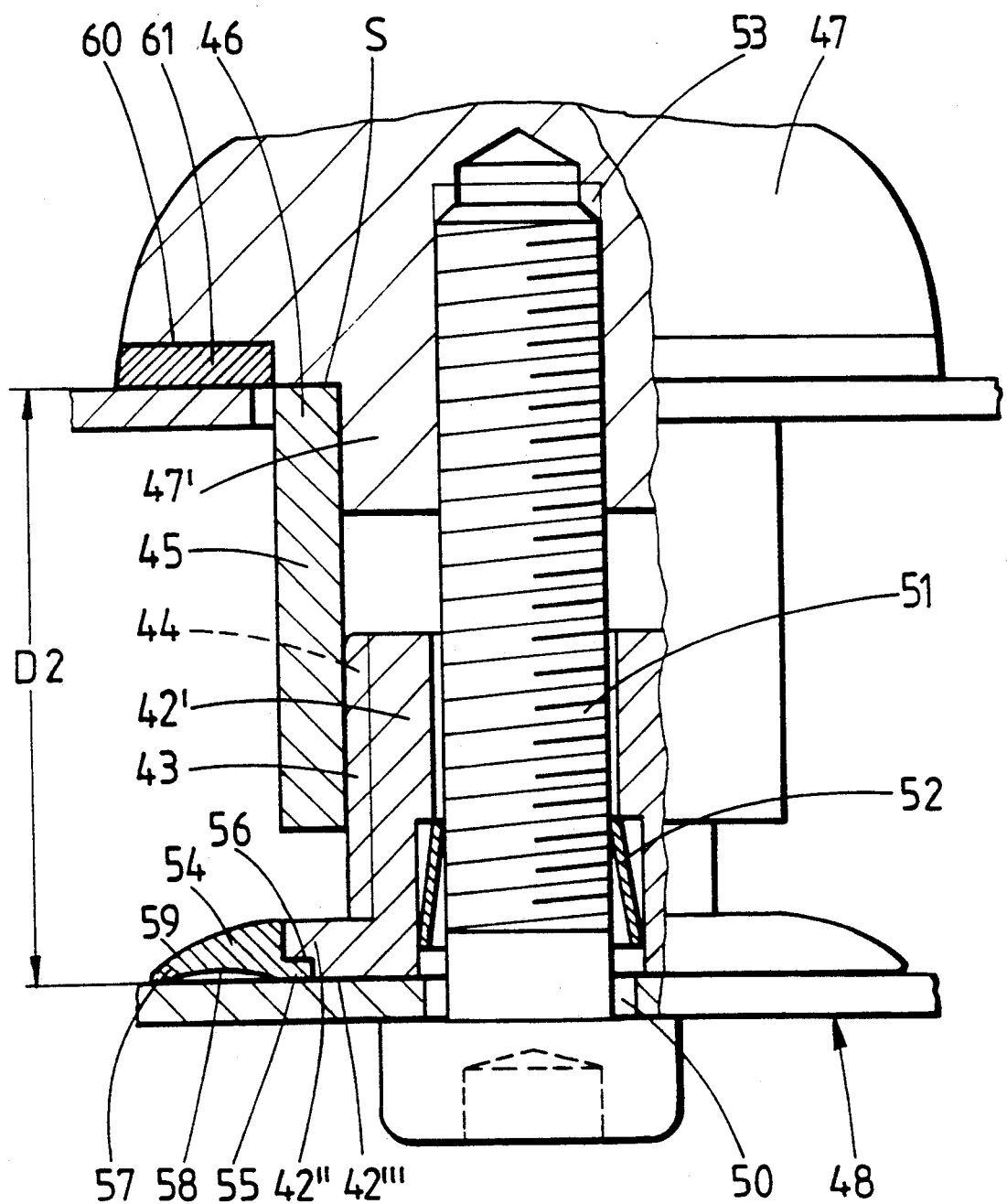

DEVICE FOR THE CLAMPING ATTACHMENT OF SPACED STRUCTURAL PARTS

FIELD AND BACKGROUND OF THE INVENTION

The present invention relates to a device for the clamping attachment of spaced structural parts by means of a connecting screw and a distance plate which is arranged in said space, rests with its outer broad side against the one structural part and is equipped with helically lying ascent support surfaces, opposite which there are form-fitting helical mating ascent support surfaces associated with the other structural part, and in which connection the turning of the support surfaces with respect to each other determines the maximum measurement assumed, in the manner that the distance plate is driven into its resting position by connection with the outer surface of the connecting screw.

One device of the aforementioned type is known from EP 0 176 663 B1, (corresponding to U.S. Pat. No. 4,682,906) in which the resting height is invariable after the resting position of the distance plate has been reached.

SUMMARY OF THE INVENTION

The object of the present invention is so to develop a device of this type in a manner simple to manufacture that a predetermined additional clamping is possible after the resting position of the distance plate has been reached.

The object is achieved in a device of this type in the manner that the resting height can be reduced by a predetermined amount by the clamping force of the connecting fastening screw.

As a result of this development, there is created a device of the type in question which makes it possible, even after the resting position of the distance plate has been reached, still to exert an additional clamping, with, at the same time, a reduction of the resting height. This is advantageous in particular when, for instance, rubber packings are to be pressed-on. Furthermore, in this way, deformation paths can be created so that a bulging inward of the sheet-metal wall having the female thread is produced. The predetermined amount of the reduction is adapted to the purpose of use. After reaching the resting height which has been reduced to the predetermined amount, the clamping force exerted by the connecting screw does not lead to any further change in the resting height.

It has been found advisable from a construction standpoint for the reduction in the size of the spacing to be less than the amount of displacement of the distance plate.

One advantageous version is characterized by the fact that the reduction in the amount of the spacing is obtained in the manner that protrusions on the ascent support surfaces of the distance plate which is passed through, with friction lock, by the connecting screw dig into the mating ascent support surfaces. As soon as the distance plate has reached its resting position and the connecting screw has been tightened further in clamping direction, this leads to the digging of the protrusions of the distance plate into the mating ascent support surfaces. This naturally presupposes that the material of which the distance plate having the protrusions is made is harder than the material of the structural part which forms the mating ascent support surfaces. A reversal would also be possible in the manner that the protrusions are developed on the mating ascent support surfaces. However, in all cases, the result is obtained that even then the resting height can be reduced by the amount by which the protrusions dig in. As already mentioned above, this can be used in order to bring a rubber packing into sufficient clamping position.

It is optimal if the protrusions are developed as cutting-edge ribs of a height corresponding to the amount of the predetermined reduction. This measure produces advantages upon the digging of the cutting-edge ribs into the corresponding support surfaces.

However, as an alternative, it is also possible for the reduction in the resting height to be obtained by friction-tight axial displacement of an annular part bearing the mating ascent support surfaces as thread in a socket. The annular part is seated in said socket for axial displacement in a press fit but non-rotatable. Upon the screwing, the resting height is first of all obtained by the rotation of the distance plate. Upon continuation of the screwing process, this leads to displacement of the annular part in the socket up to a resting position of the annular part, with reduction of the resting height. This reduction also serves for corresponding uses of the device. Instead of engaging in a socket, it would also be possible for the annular part to surround a collar of the one structural part with a press fit. The press fit is of such a nature that while the annular part cannot turn, it is nevertheless displaceable in axial direction upon the exertion of a certain force.

A stable stop limitation is obtained in the manner that the annular part moves in the socket up into a position flush with the bottom of the socket. Further clamping forces acting in axial direction on the annular part are then introduced into the facing structural part so that the socket can be relatively easily constructed.

One advantageous feature furthermore resides in the fact that the socket is provided with holding elements, for instance hooks, for fastening to the one structural part.

An alternative solution is characterized by the fact that the reduction in the resting height is obtained by bringing the distance plate towards the adjacent structural part with the compressing of a spacer member which bridges over the distance. Upon the tightening of the connecting screw, the spacer member first of all comes against the adjacent structural part, whereby the resting height is determined. This is achieved by the friction lock between the distance plate and the connecting screw. Upon continuation of the screwing, the distance plate then remains stationary while the distance member is compressed with a reduction in the resting height, which amount is again predeterminable. Instead of providing the compressible distance member on the distance plate, it would also be possible to associate a compressible member with the structural part adjacent the distance plate.

From a construction standpoint, it is favorable for the distance member to be developed as an edge-side annular flange of the distance plate. The reduction in the resting height is then at an end when the distance plate itself comes against the adjacent structural part. The material of the annular member is treated gently despite compression, so that the spacer member is completely functional again even after the loosening of the screw connection.

From the viewpoint of the resting, it is advantageous for the annular flange to be developed as a lip which tapers towards the structural part.

Finally, it is also favorable for the end surface of the annular part to rest by abuttment against the structural part, which rests, via a compressible spacer piece, against the second layer of the first structural part. The reduction of the resting height is also transmitted to this compressible spacer piece. This means that the amount of the reduction corresponds to the amount of the compression of the spacer piece.

BRIEF DESCRIPTION OF THE DRAWINGS

With the above and other and other advantages in view, the present invention will become more clearly understood in connection with the detailed description of preferred embodiments, when considered with the accompanying drawings, of which:

FIG. 17 is a sectional view corresponding to FIG. 16 in which, differing from the latter, the resting height has been reduced by the predetermined amount.

DETAILED DESCRIPTION OF THE PREFERRED EMBODIMENTS

Figure 1:
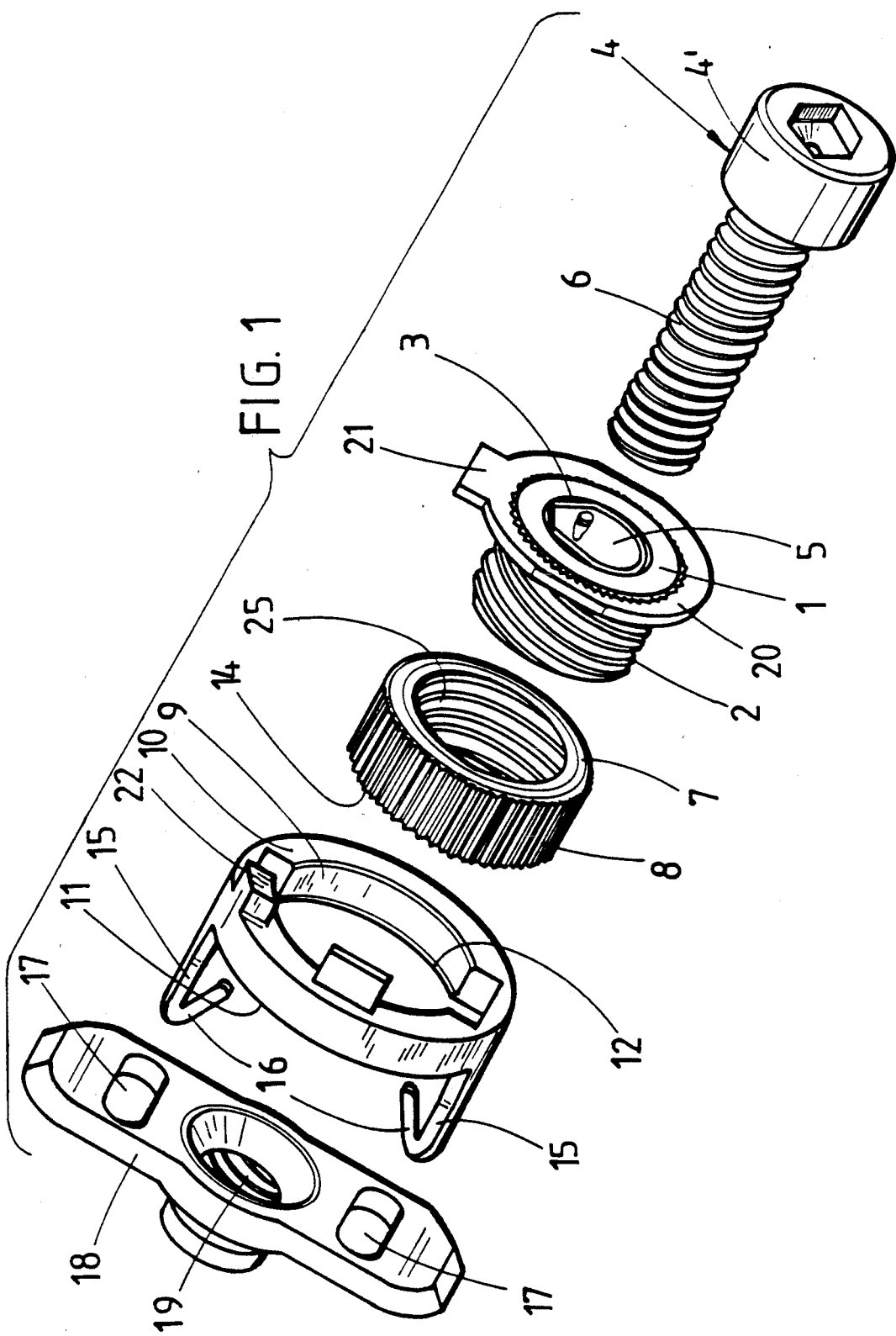
FIG. 1 is an exploded, perspective view of the device in accordance with the first embodiment.

Referring to the first embodiment, shown in FIGS. 1 to 6, the device has a distance plate 1 with a left-hand, external thread which forms ascent support surfaces 2. Arranged centrally in the distance plate 1 there is an insertion hole 3 for a connecting screw 4. The insertion hole 3 is lined with a conically shaped clamping ring 5 for easier introduction of the connecting screw 4. The clamping ring 5 is secured against rotation in the insertion hole 3 and enters into friction lock with the shank of the connecting screw 4. The shank of the latter forms a right-hand thread 6.

The distance plate 1 can be screwed into an annular part 7. On the outer surface of the annular part 7 there is a circumferential toothing 8, which extends parallel to the longitudinal axis of the annular part 7. This makes it possible to insert the annular part 7, secured against rotation, in a hole 9 of corresponding diameter in an annular socket 10 in a press fit. To be sure, the annular part 7 can be moved axially within the hole 9 of the socket 10. From the bottom 11 of the socket 10 a collar 12 extends within the region of the hole 9, the collar being arranged inclined at an acute angle to the longitudinal center axis of the socket 10. The collar 12 cooperates with the facing annular bevel 13 of the annular part 7. Therefore, the end surface 14 of the annular part 7 adjacent to the annular bevel 13 can be brought up into position flush with the bottom 11 of the socket 10.

The socket 10 bears, integral with it, hooks 15 which protrude on its bottom side 11. Two such hooks 15 are present diametrically opposite each other on the socket which is made of plastic. The hooks 15 have resilient sections 16 which permit insertion of the hooks 15 into openings 17 of a structural part 18. After the insertion, the spring sections of the hooks 15 engage behind the structural part 18 and secure the position of the socket 10 with respect to it. The structural part 18 is developed as strap with threaded hole 19 in its central region for the screwing-in of the connecting screw 4. Firmly attached with the one end of the distance plate 1 there is a stop disk 20. A radially protruding nose 21 thereon comes, in the case of the preassembled device, against a stop 22 on the socket 10. In this preassembled position, the end surface 14 of the annular part 7 is at a distance x in front of the bottom side 11 of the socket 10 or the facing surface of the structural 18.

Figure 2:
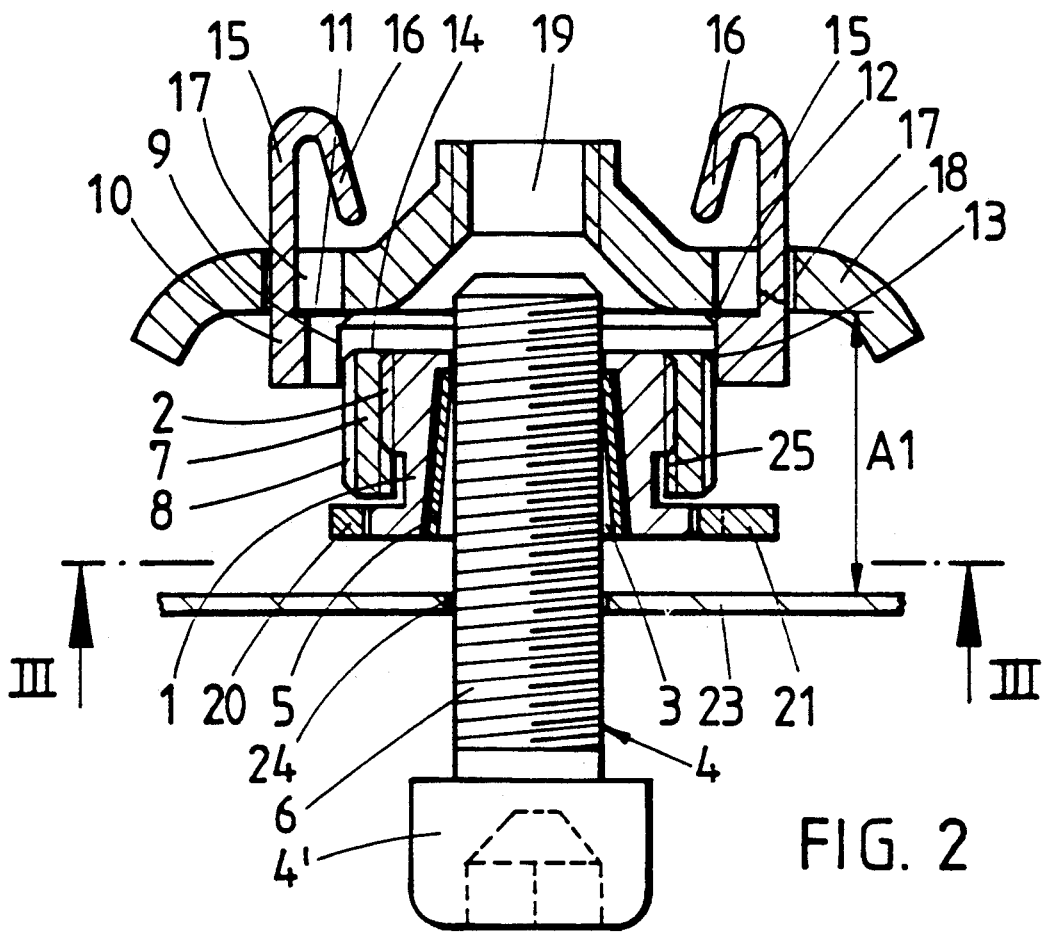
FIG. 2 is a longitudinal section through the device with connecting screw inserted with friction lock in the distance plate.
Figure 3:
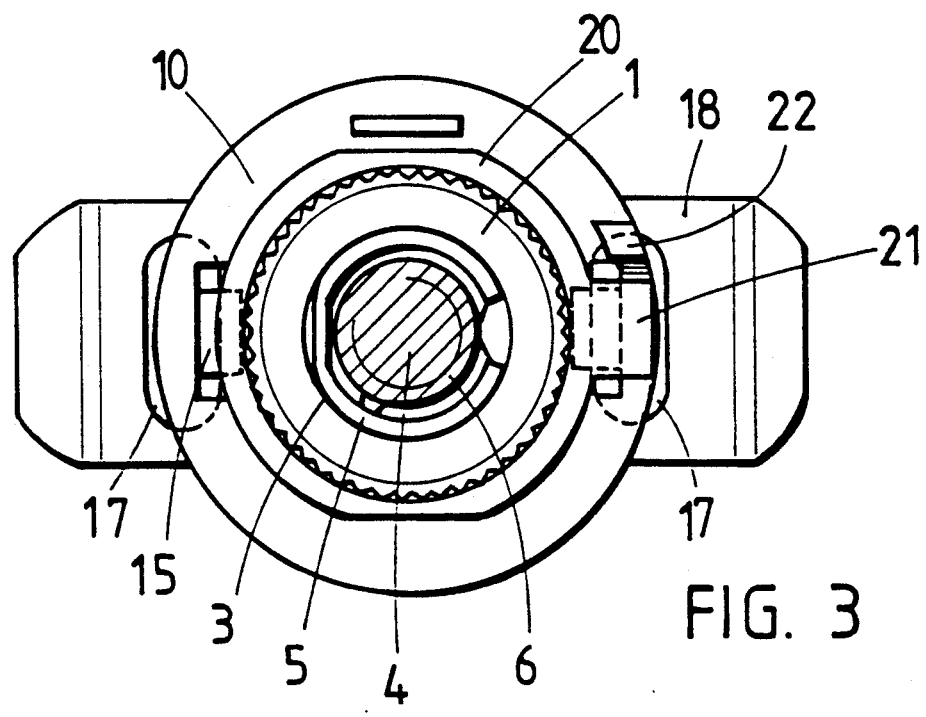
FIG. 3 is a section along the line III—III of FIG. 2.
Figure 4:
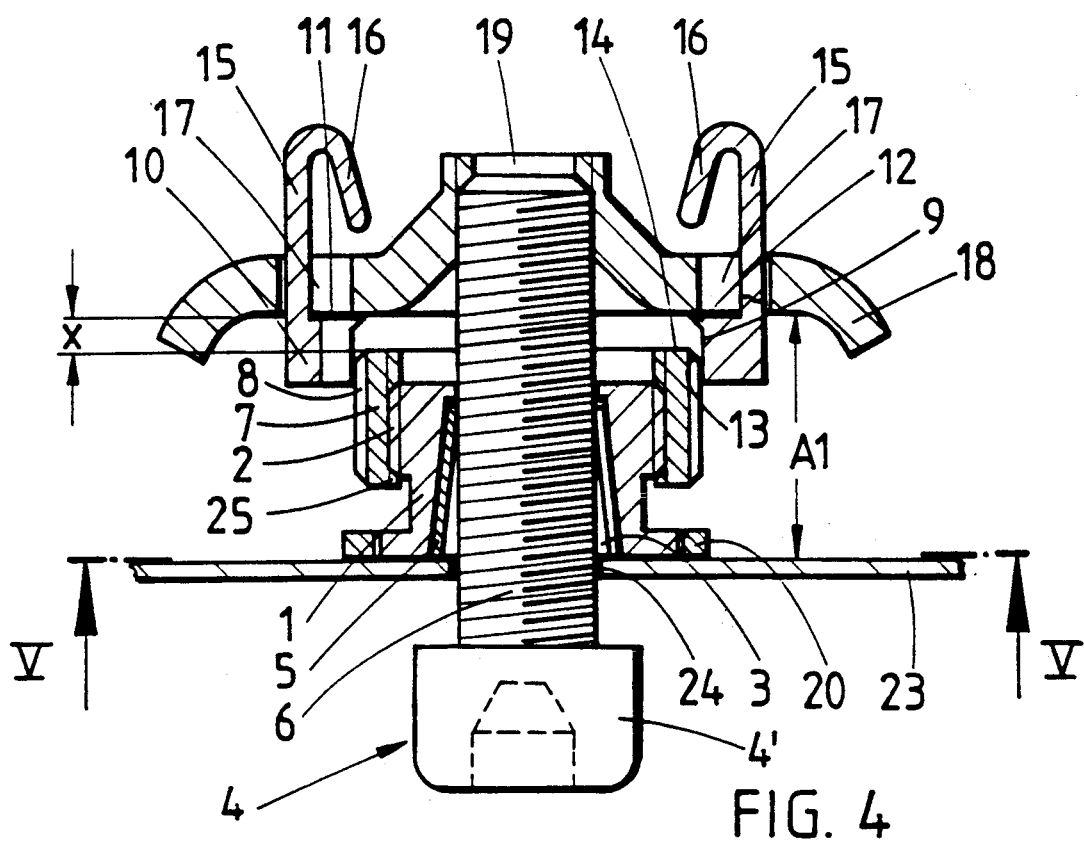
FIG. 4 is a view corresponding to FIG. 2 in which, differing from the latter, the distance plate has been brought into the resting position by turning the connecting screw.
Figure 5:
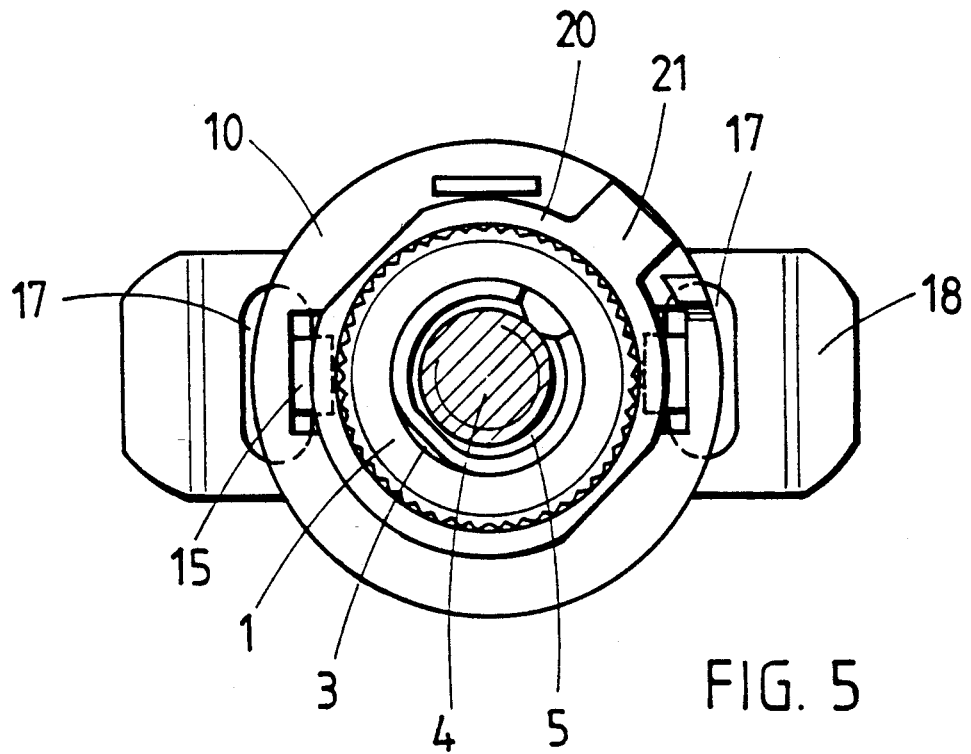
FIG. 5 is a section along the line V—V of FIG. 4.
Figure 6:
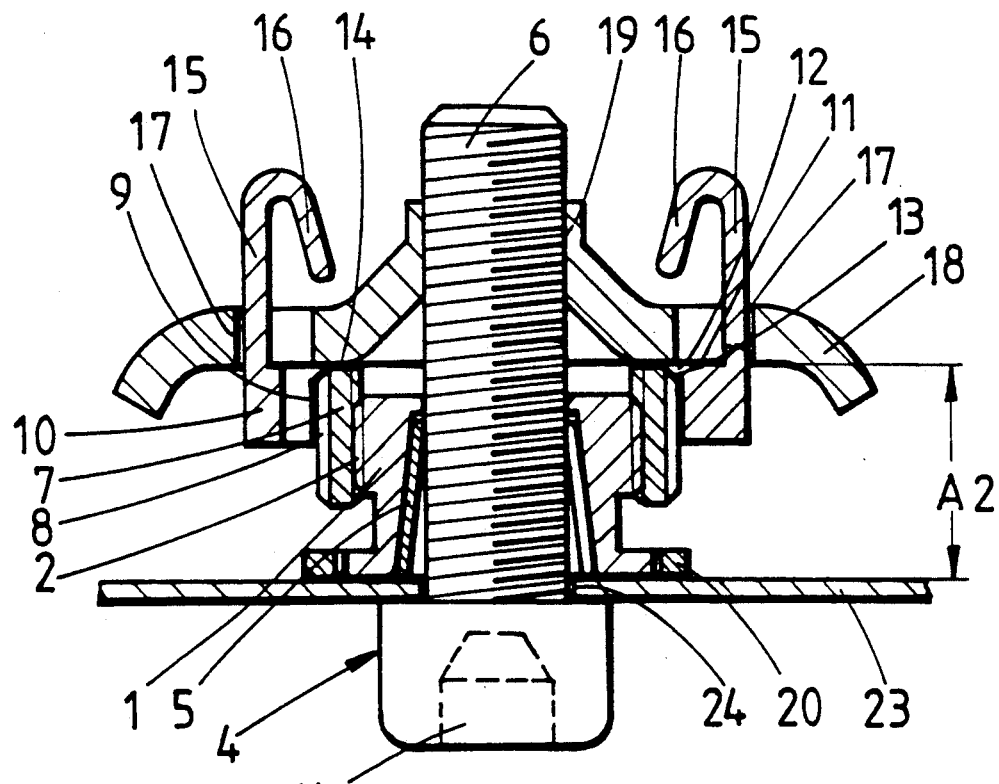
FIG. 6 is a section corresponding to FIG. 4, but with reduced resting height.
Figure 7:
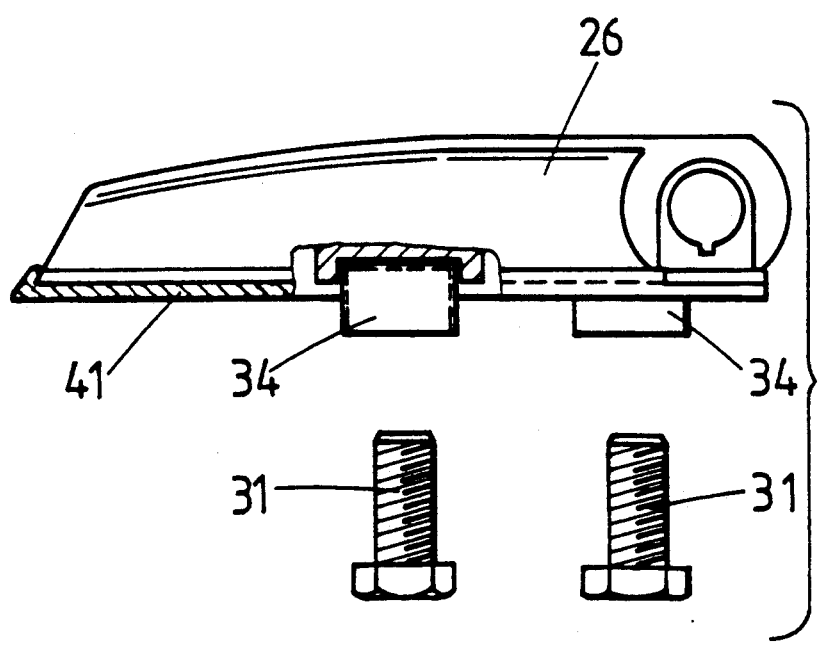
FIG. 7 is a view of the device according to the second embodiment which is used in the case of a hinge employed in automotive engineering.
Figure 8:
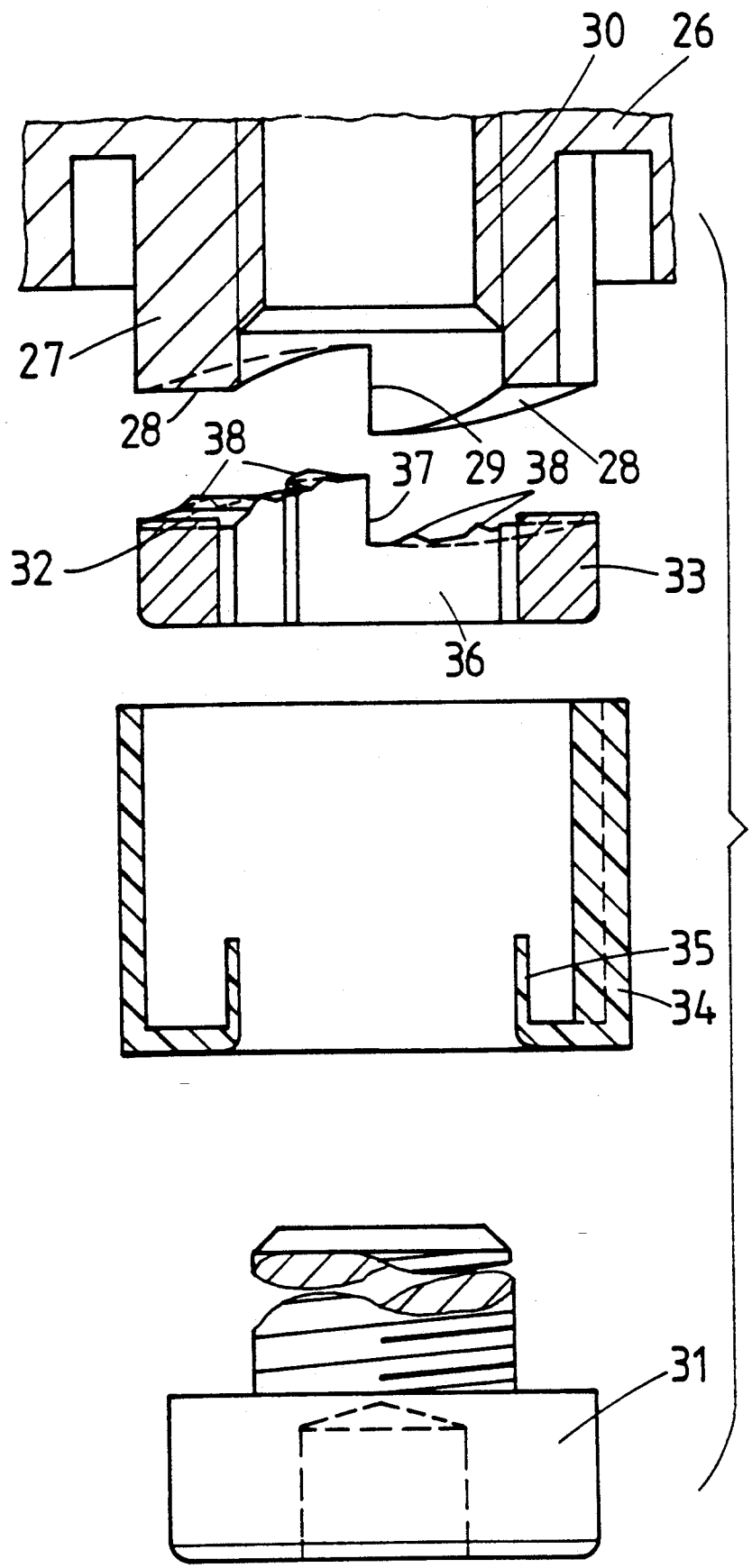
FIG. 8 is an exploded sectional view of the corresponding parts of the device.
Figure 9:
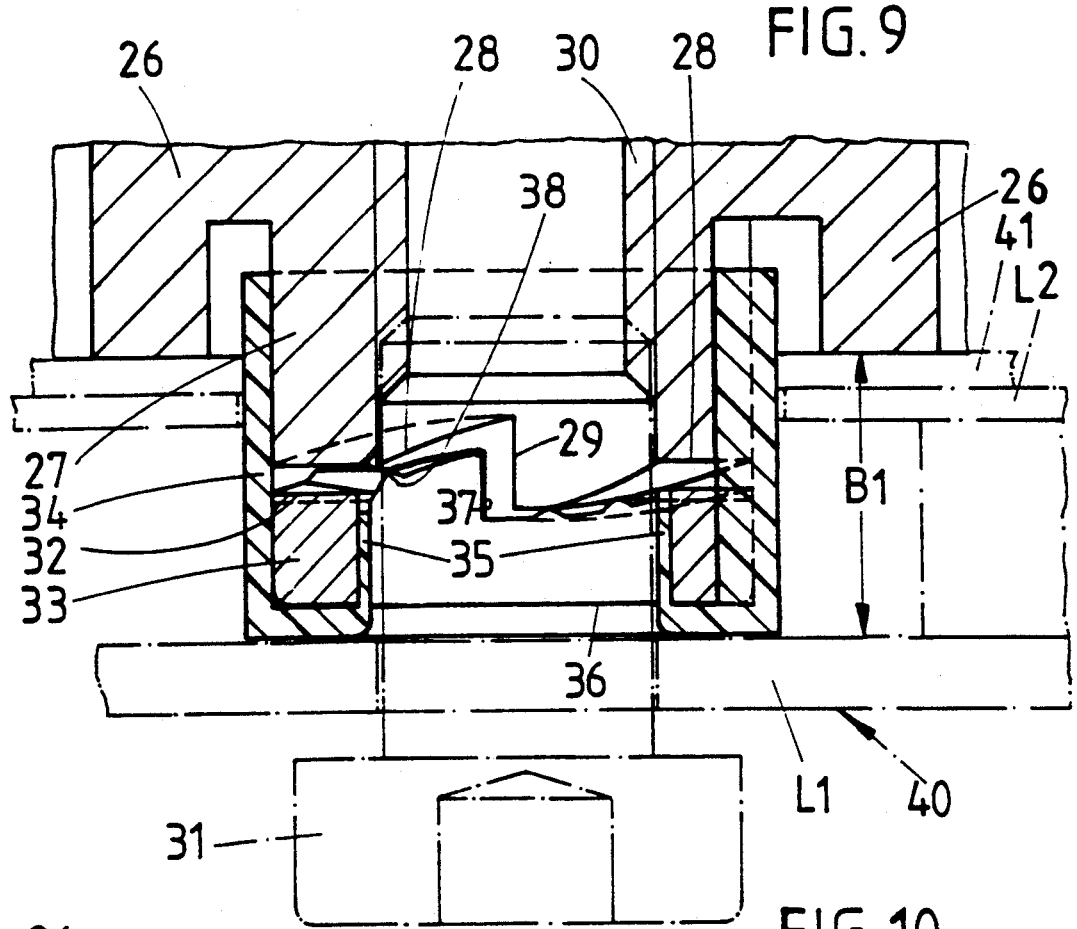
FIG. 9 is a longitudinal section through the device with the distance plate brought into resting position.
Figure 10:
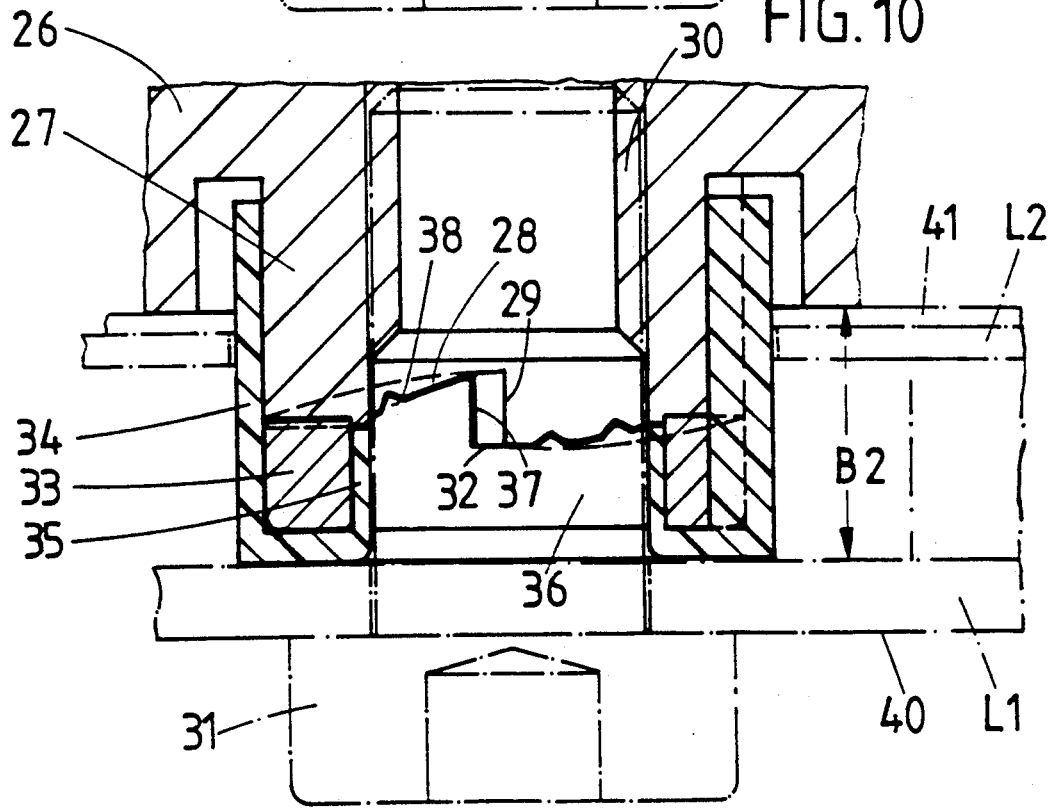
FIG. 10 is a section corresponding to FIG. 9 in which the resting height has been reduced by a predetermined amount as compared with FIG. 9.
Figure 11:
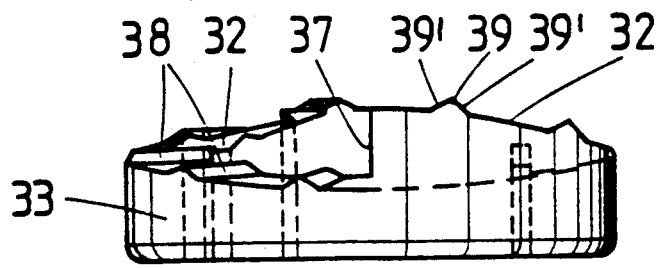
FIG. 11 is a side detail view of the distance plate.
Figure 12:
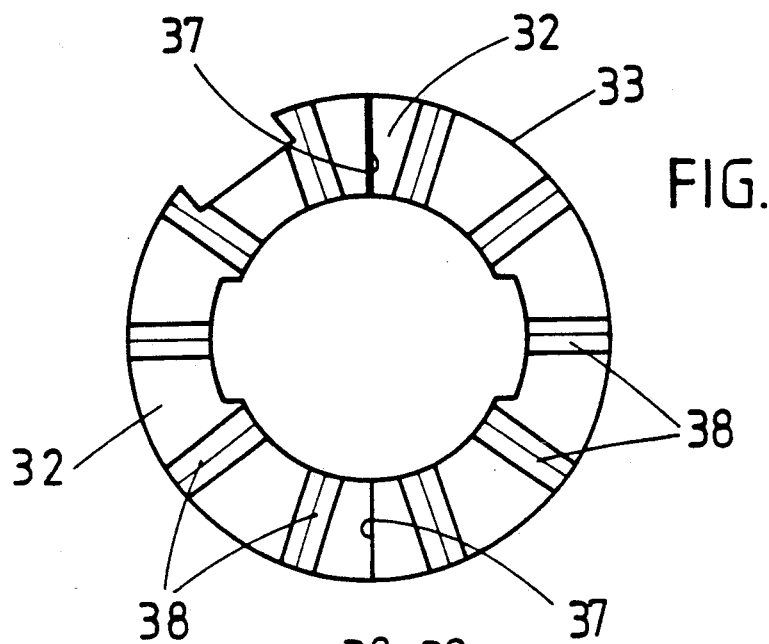
FIG. 12 is a top view of the distance plate.
Figure 13:
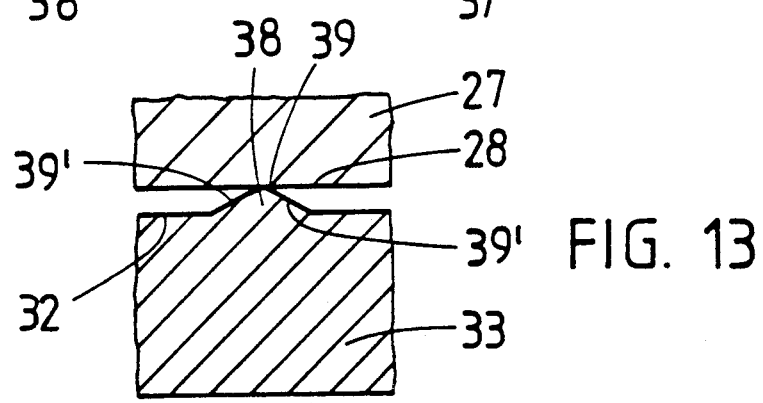
FIG. 13 is a greatly enlarged, longitudinal section in the region of a cutting-edge rib of the distance plate, the rib lying against the mating ascent support surface.
Figure 14:
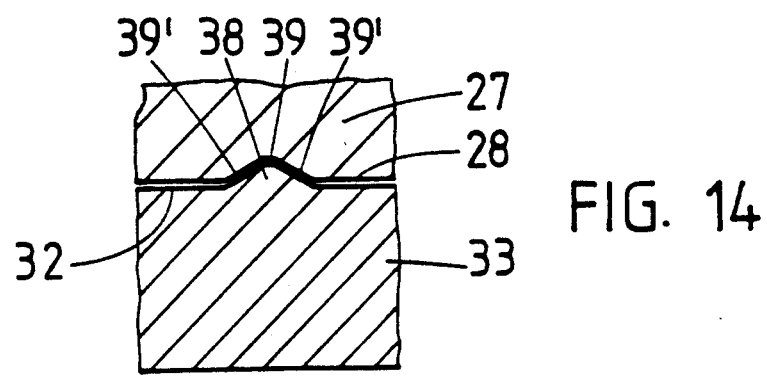
FIG. 14 is a showing corresponding to FIG. 13 indicating the digging of the rib into the mating ascent support surface.

The manner of action is as follows:

In the preassembled position (see FIGS. 2 and 3), the device is fastened to the one structural part 18. Parallel to the latter, there is another wall-like structural part 23. The distance between the two structural parts 18 and 2 is designated A1. As shown in FIG. 2, the distance plate 1 still does not rest against the structural part 23. The connecting screw 4 can now be inserted, passing through a hole 24 in the structural part 23, into the distance plate 1. The clamping ring 5 which is arranged, secured against turning, in the distance plate 1 thereby enters into friction lock with the outer surface of the connecting screw 4.

Upon the exerting of an axial displacement together with a turning, the connecting screw 4 engages into the threaded hole 19 of the structural part 18. In hand with this, the distance plate 1 is carried along in the same direction of rotation, namely in clockwise direction. Since its ascent support surfaces 2 are left-handed and are in engagement with the mating ascent support surfaces 25 of the annular part 7, this leads to displacement of the distance plate 1 in the direction towards the structural part 23. Said mating ascent support surfaces 25 are the corresponding internal thread of the annular part 7. In this resting position of the distance plate 1, the resting height between the two structural parts 18 and 23 is also A1. Simultaneously with the rotation and axial displacement of the distance plate 1, its nose 21 has also moved away from the stop 22 of the socket 10 so that the turning actuation is not impaired.

Upon reaching the resting position of the distance plate 1, the connecting screw 4 can be further tightened. The distance plate 1 remains in this connection in its resting position. As soon as the screw head 4 strikes the structural part 23, there takes place, superimposed on this, a reduction in the resting height A1, the distance plate 1 and the annular part 7 moving as a single unit in axial direction. The displacement is at an end when the end surface 14 of the annular part 7 is flush with the bottom 1 of the socket 10 and then strikes both the collar 12 and the facing surface of the structural part 18.

The resting height A1 has thus been reduced by the predetermined amount x by the clamping force of the connecting screw 4, so that a new resting height A2 is present, it corresponding to A1 minus x.

The amount x is adjustable upon the preassembly, namely be displacing the annular part 7 a corresponding distance within the socket 10. The smaller the space between end surface 14 of the annular part 7 and bottom 11 of the socket 10, the less the reduction of the spacing height A1.

In the case of the second embodiment (see FIGS. 7 to 14), the device is associated with a hinge-like structural part 26. From the bottom of the latter there extend two collars 27 which are adjacent to each other. Each collar 27 forms two helically shaped lefthand mating ascent support surfaces 28. The two mating ascent support surfaces 28 are limited by diametrically lying steps 29. Adjoining the latter centrally within the collar 27 there is a threaded hole 30 for the entrance of a connecting screw 31.

Righthand ascent support surfaces 32 of a distance plate 33 cooperate with the mating ascent support surfaces 28. It extends along one end of a plastic bushing 34 which protrudes by means of two diametrically opposite inner arms 35 into the insertion opening 36 of the distance plate 33. The inner arms 35, in this connection, form clamping members which come against the outer surface of the connecting screw 31. The plastic bushing 34 which is placed, together with the distance plate 33, on the collar 27 is arranged for limited rotation with respect to the collar 27 as a result of stops, not shown in detail.

The ascent support surfaces 32 are also limited by diametrically opposite steps 37 which, in preassembled position of the device, flank the steps 29 of the mating ascent support surfaces 28.

Angularly distributed radially aligned protrusions 38 extend over the ascent support surfaces 32. These protrusions are developed as cutting-edge ribs. They have a ridged-roof shape with roof slopes 39' meeting in a ridge 39. The material of the distance plate 33 is harder than the material of the collar 27.

The hinge-like structural part 26 is associated with a double-walled structural part 40 with the interpositioning of a packing 41. After insertion of the connecting screw 31 into the insertion opening 36 of the distance plate 33, upon the turning of the screw 31 in clockwise direction the spacer plate 33 is carried along by the latter in the direction of rotation by friction lock. As a result of the oppositely directed ascent support surfaces 32 and the mating ascent support surfaces 28, the distance plate 33 is spread apart from the collar 27. The displacement is limited by the outer layer L1 of the structural part 40 (see FIG. 9). There is now a resting height B1 between structural part 26 and structural part 40. No substantial clamping force then acts on the packing 41. If the tightening of the connecting screw 31 is continued, this leads to a clamping of the collar 27 and the distance plate 33 against each other, the protrusions 38 of the distance plate 33 which are developed as knife-edge ribs digging into the material of the collar 27. By the amount of the digging-in and therefore the extent of the protrusions 38 above the ascent support surfaces 32, the resting height B1 is reduced to the resting height B2. In hand with this, the packing 41 is clamped against the second layer L2 of the structural part 40.

Figure 15:
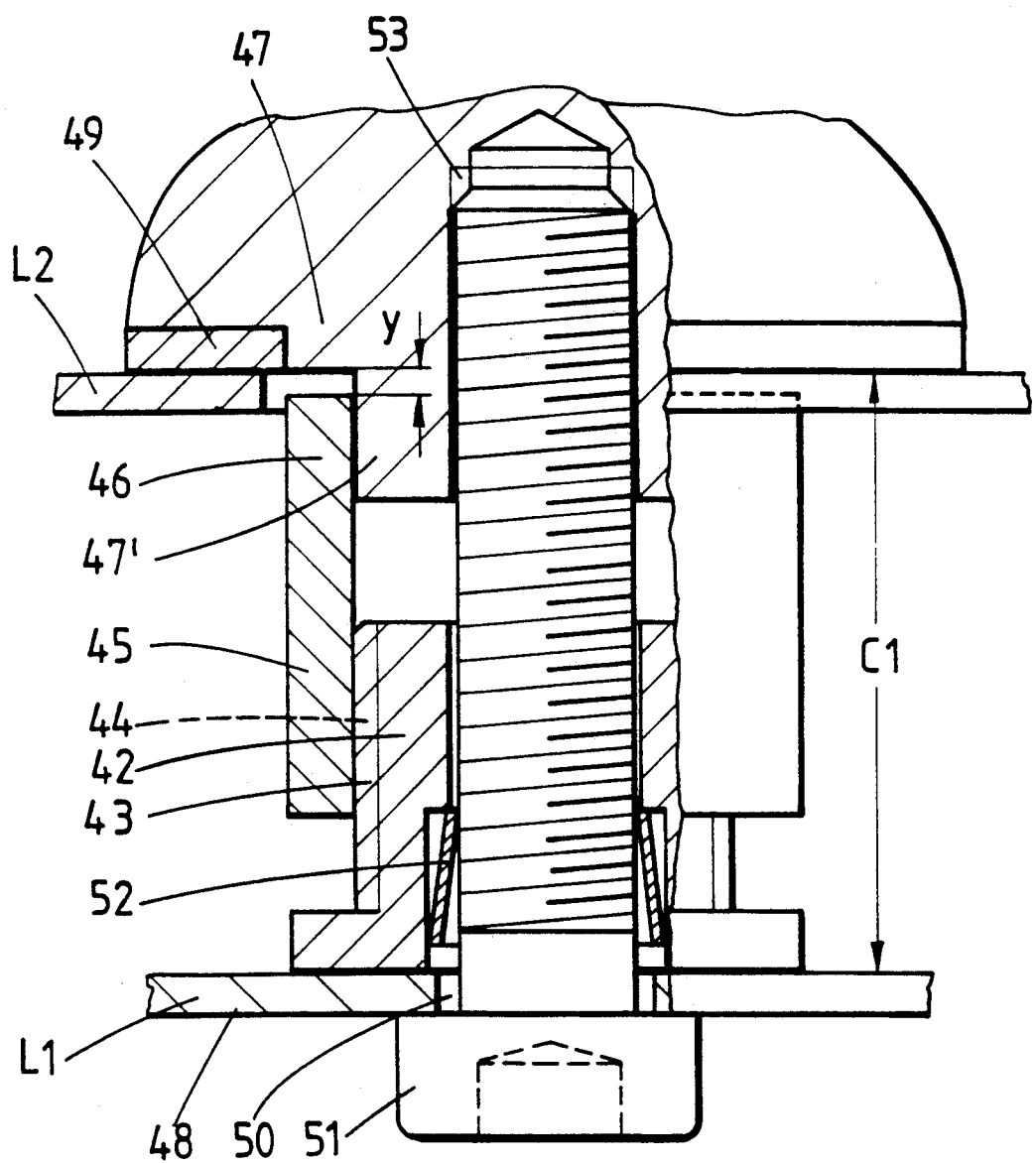
FIG. 15 shows the third embodiment of the device, partly in elevation and partly in longitudinal section.

The third embodiment, shown in FIG. 15, has a distance plate 42 which corresponds substantially to that of the first embodiment. On its circumference, the distance plate 42 is provided with the ascent support surfaces 43, developed as external thread. These surfaces engage into the mating ascent support surfaces 44 of an annular part 45. The latter continues in the form of a collar over the threaded hole (mating ascent support surfaces 44). The corresponding annular-part collar 46 surrounds, with press fit, a collar 47, which protrudes beyond the structural part 47 and is passed through centrally by a threaded hole 53.

Between the structural part 47 and the facing layer L2 of the other, two-layer structural part 48 there is a packing disk 49. The other layer L1 is provided with a hole 50 for the entrance of the connecting screw 51. Its shank carries along in friction lock, the distance plate 42 as the result of a clamping ring 52.

In the preassembled position, there is a distance y between the free front end of the annular-part collar 46 and the structural part 47, this distance being determined by a correspondingly far pushing of the annular part 45 onto the collar 47'.

After insertion of the connecting screw 51, upon rotation thereof the distance plate 42 is carried along by friction lock, reaching the resting position shown in the drawing. The resting height is indicated by C1. Upon continuation of the turning of the screw, the structural part 47 moves in the direction of the structural part 47 or its layer L2, the collar 47' of the structural part 47, overcoming the press fit, entering into the annular-part collar 46 and clamping the packing disk 49 against the layer L2 of the structural part 48. The clamping is at an end when the front end of the structural-part collar 46 strikes against the facing surface of the structural part 47. The resting height C1 has then been reduced by the amount y.

Figure 16:
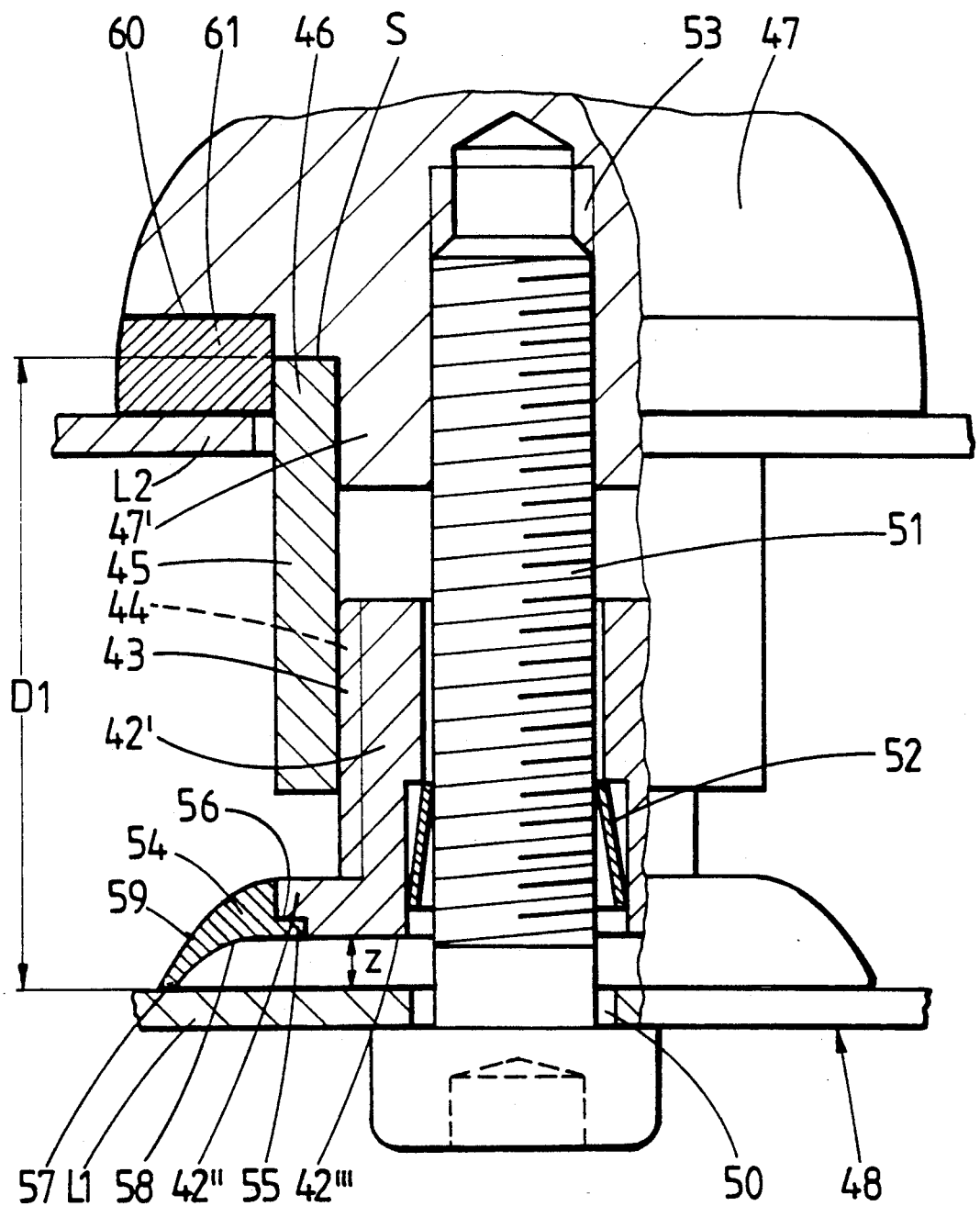
FIG. 16 shows the fourth embodiment of the device upon reaching the provisional resting height, seen partly in elevation and partly in longitudinal section.

The fourth embodiment, shown in FIGS. 16 and 17, corresponds extensively to the third embodiment, shown in FIG. 15. In detail, this fourth embodiment has a distance plate 42'. In accordance with FIGS. 16 and 17, it forms, at its lower end, a radially protruding flange 42''. The circumferential surface of the latter is stepped and serves to receive an edge-side annular flange 54. The radially inwardly directed annular collar 55 of the latter engages into a corresponding recess 56 in the flange 42'' of the distance plate 42' so that the annular flange 54 is aligned in the region of the annular collar 55 with the outer broad side 42''' of the distance plate 42'. Accordingly, the annular flange 54 has, in the region of the flange 42'', the thickness of said flange 42'''. The edge-side annular flange 54 continues on the other side of its place of connection into a lip 57 which tapers downward as shown in FIG. 16, namely via a rounded inner arc 58 and a rounded outer arc 59. Due to this development, the edge-side annular flange 54 forms a distance member facing in the direction of the layer L1 of the first structural part 48. Rubber or a corresponding compressible plastic is selected as material for it.

The distance plate 42' is similarly provided on its circumference with an external thread which forms ascent support surfaces 43. They cooperate with the internal thread of the annular part 45, which thread forms mating ascent support surfaces 44. This internal thread, or mating ascent support surfaces 44, extends over a lower partial length of the annular part 45. The latter continues on the other side of the mating ascent support surfaces 44 into the annular-part collar 46, which, with press fit, surrounds the collar 47' protruding beyond the structural part 47 in such a manner that the annular part 45 abuts against the structural part 47. The threaded hole 53 which extends into the structural part 47 extends centrally from this collar 47'. On the other side of the place of abutment S, the structural part 47 is provided with a step-shaped recess 60 to receive a compressible spacer piece 61 which continues to beyond t he abutment place S. The protrusion beyond the abutment place S corresponds approximately to the depth of the recess 60. Thus, the structural part 47 lies, over this spacer piece 61, which also consists of rubber or suitable plastic, against the second layer L2 of the two-layer first structural part 48.

As in the embodiment shown in FIG. 15, the distance plate 42' receives a clamping ring 52. Therefore, after insertion of the connecting screw 51 and engagement thereof into the threaded hole 53 of the structural part 47, the distance plate 42' is carried along in friction lock via the clamping ring 52, the plate being shifted due to the oppositely directed slopes of connecting screw 51 and ascent support surfaces 43, into the resting position shown in FIG. 16. The annular flange 54 of the distance plate 42, has then entered into the resting position. This means that the free end of the lip 57 has come on to the layer L1. The friction lock between connecting screw 51 and clamping ring 52 is so selected that in the resting position of the distance plate 42' no carrying along thereof in rotation takes place any longer. There is thus a resting height of D1 in the position shown in FIG. 16. This height extends between the abutment place S and the inner surface of the layer L1. Between the broad side 42''' of the distance plate 42' and the inner surface of the layer L1, there still remains a distance z. Upon continuing the screwing the structural part 47 moves in the direction towards the structural part 48, with simultaneous carrying along of the distance plate 42' and annular part 45 which form a structural unit. The clamping is at an end when the broad side 42''' of the distance plate 42' strikes the inner surface L1 of the first structural part 48 (see FIG. 17). The compressible annular flange 54 then assumes the position shown in FIG. 17. The compressible spacer piece 61 has also been compressed by the amount of reduction z so that the resting height is now D2.

If the screw is unscrewed, the distance plate 42', together with the elastic annular flange 54, can be used again.

A modification of the structural form last described could be effected in the manner that the annular part 45 could also be subject to a displacement on the collar 47', as in the embodiment according to FIG. 15. In such case, the entire amount of reduction from the resting position is formed from the displacement path of the distance plate and that of the annular part together.

Further embodiments are conceivable. For example, it would be possible to develop the device in such a manner that after reaching the resting position of the distance plate, a sheet-metal wall having a female thread is pulled up to a position of application against the distance plate.

We claim:

1. A device for a clamping connection of first and second structural parts, the device comprising:
   a fastening screw, and a spacer plate located in an intervening space between said first and said second structural parts, said spacer plate resting on an outer broad side thereof against said first structural part, said screw passing through said plate and making frictional contact therewith;
   wherein said second structural part has a helical pitch support surface for mating with said screw;
   said plate has a helical pitch support surface fitting said screw and being located opposite said helical pitch support surface of said second structural part;
   said plate is advanced by frictional engagement with said screw upon rotation of said screw relative to said plate to bring said plate into a support position in which said plate lies against said first structural part to establish a first support distance from said first structural part to said second structural part;
   said device includes restraining means providing a predetermined restraining force against rotation of said screw, and said first support distance can be reduced by a predetermined amount of clamping force of the screw; and
   a reduction in the amount of said first support distance to a second support distance smaller than said first support distance is accomplished by displacement of said second structural part toward said first structural part by a predetermined amount of regions lying along said helical pitch support surfaces in opposition to said predetermined restraining force.

2. A device according to claim 1, wherein the reduction in said first support distance is less than the amount of displacement of the distance plate.

3. A device according to claim 1, wherein the reduction in said first support distance is obtained by protrusions on the helical pitch support surfaces of the distance plate, which is passed through with friction lock by said screw, digging into a mating helical pitch support surface.

4. A device according to claim 3, wherein the protrusions are formed as cutting-edge ribs of a height corresponding to the amount of the predetermined reduction.

5. A device according to claim 1, wherein said restraining means comprises an annular part, and a socket for receiving said annular part; and
   the reduction of said first support distance is obtained by axial displacement under friction of said annular part, said annular part bearing a helical pitch support surface as a thread within said socket.

6. A device according to claim 5, wherein the annular part shifts in the socket up into a position flush with the bottom of the socket.

7. A device according to claim 5, wherein the socket is provided with holding means for attachment to said first structural part.

8. A device according to claim 1, wherein said restraining means comprises an annular part, and a socket for receiving said annular part; and
   the reduction in said first support distance is obtained by axial displacement with friction of said annular part, said annular part bearing a thread as helical pitch support surface for engagement with a collar of said first structural element.

9. A device according to claim 1, wherein said restraining means comprises an annular flange, and the reduction in of said first support distance is effected by movement of the distance plate towards an adjacent structural part, with compression of said annular flange as a spacer element against said adjacent structural part.

10. A device for a clamping connection of first and second structural parts, the device comprising:
- a fastening screw, and a spacer plate located in an intervening space between said first and said second structural parts, said spacer plate resting on an outer broad side thereof against said first structural part, said screw passing through said plate and making frictional contact therewith;
- wherein said second structural part has a helical pitch support surface for mating with said screw;
- said plate has a helical pitch support surface fitting said screw and being located opposite said helical pitch support surface of said second structural part;
- said plate is advanced by frictional engagement with said screw upon rotation of said screw relative to said plate to bring said plate into a support position in which said plate lies against said first structural part to establish a first support distance from said first structural part to said second structural part;
- said first support distance can be reduced by a predetermined amount of clamping force of the screw;
- said device further comprises a spacer element located between said plate and said second structural part;
- a reduction in said first support distance is accomplished by movement of said plate towards said second structural part with compression of said spacer element; and
- said spacer element is developed as an edge-side annular flange extending from said plate.

11. A device for a clamping connection of first and second structural parts, the device comprising:
- a fastening screw, and a spacer plate located in an intervening space between said first and said second structural parts, said spacer plate resting on an outer broad side thereof against said first structural part, said screw passing through said plate and making frictional contact therewith;
- wherein said second structural part has a helical pitch support surface for mating with said screw;
- said plate has a helical pitch support surface fitting said screw and being located opposite said helical pitch support surface of said second structural part;
- said plate is advanced by frictional engagement with said screw upon rotation of said screw relative to said plate to bring said plate into a support position in which said plate lies against said first structural part to establish a first support distance from said first structural part to said second structural part;
- said first support distance can be reduced by a predetermined amount of clamping force of the screw;
- said device further comprises a spacer element located between said plate and said second structural part;
- a reduction in said first support distance is accomplished by movement of said plate towards said second structural part with compression of said spacer element; and
- said spacer element comprises an annular flange developed as a lip which tapers towards said second structural part.

12. A device for a clamping connection of first and second structural parts, the device comprising:
- a fastening screw, and a spacer plate located in an intervening space between said first and said second structural parts, said spacer plate resting on an outer broad side thereof against said first structural part, said screw passing through said plate and making frictional contact therewith;
- wherein said second structural part has a helical pitch support surface for mating with said screw;
- said plate has a helical pitch support surface fitting said screw and being located opposite said helical pitch support surface of said second structural part;
- said plate is advanced by frictional engagement with said screw upon rotation of said screw relative to said plate to bring said plate into a support position in which said plate lies against said first structural part o establish a first support distance from said first structural part to said second structural part;
- said first support distance can be reduced by a predetermined amount of clamping force of the screw;
- said device further comprises a spacer element located between said plate and said second structural part;
- a reduction in said first support distance is accomplished by movement of said plate towards said second structural part with compression of said spacer element;
- said device further comprises a third structural part located on a side of said first structural part opposite said second structural part for engagement with an end of said screw, a further spacer element which is compressible and is positioned between said first and said third structural parts;
- said first structural part comprises a layer element; and
- the device further comprises an annular part which is coaxial to said screw and rests in abutment against said third structural part which rests, via said further spacer element against said layer element of said first structural part.

13. A device for a clamping connection of first and second structural parts, the device comprising:
- a fastening screw, and a spacer plate located in an intervening space between said first and said second structural parts, said spacer plate resting on an outer broad side thereof against said first structural part, said screw passing through said plate and making frictional contact therewith;
- wherein said second structural part has a helical pitch support surface for mating with said screw;
- said plate has a helical pitch support surface fitting said screw and being located opposite said helical pitch support surface of said second structural part;
- said plate is advanced by frictional engagement with said screw upon rotation of said screw relative to said plate to bring said plate into a support position in which said plate lies against said first structural part to establish a first support distance from said first structural part to said second structural part;
- wherein said first support distance can be reduced by a predetermined amount of clamping force of the screw;
- said device further comprises spacer means in abutment with said first structural part for resisting advance of said plate upon rotation of said screw with a predetermined force; and
- upon a further rotation of said screw to overcome the force of said spacer against said plate, said first support distance is reduced to a second support distance smaller than said first support distance.

* * * * *